US006925454B2

(12) United States Patent
Lam et al.

(10) Patent No.: US 6,925,454 B2
(45) Date of Patent: Aug. 2, 2005

(54) METHODOLOGY FOR CREATING AND MAINTAINING A SCHEME FOR CATEGORIZING ELECTRONIC COMMUNICATIONS

(75) Inventors: Kathryn K. Lam, Ridgefield, CT (US); Frank J. Oles, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 09/733,946

(22) Filed: Dec. 12, 2000

(65) Prior Publication Data

US 2002/0107712 A1 Aug. 8, 2002

(51) Int. Cl.$^7$ .............................................. G06F 17/60
(52) U.S. Cl. .............................. 706/45; 705/8; 709/206
(58) Field of Search ............................. 705/8; 706/45; 709/206

(56) References Cited

U.S. PATENT DOCUMENTS

| | | | | |
|---|---|---|---|---|
| 5,377,354 A | * | 12/1994 | Scannell et al. | 718/103 |
| 5,666,490 A | * | 9/1997 | Gillings et al. | 709/238 |
| 5,751,960 A | * | 5/1998 | Matsunaga | 709/206 |
| 5,802,253 A | * | 9/1998 | Gross et al. | 706/47 |
| 5,878,230 A | * | 3/1999 | Weber et al. | 709/238 |
| 5,878,398 A | * | 3/1999 | Tokuda et al. | 709/238 |
| 6,038,541 A | * | 3/2000 | Tokuda et al. | 705/8 |
| 6,401,073 B1 | * | 6/2002 | Tokuda et al. | 705/8 |
| 6,714,967 B1 | * | 3/2004 | Horvitz | 709/206 |
| 6,751,600 B1 | * | 6/2004 | Wolin | 706/12 |

FOREIGN PATENT DOCUMENTS

| | | | |
|---|---|---|---|
| JP | 409190447 A | * | 7/1997 |
| JP | 02000113064 A | * | 4/2000 |

OTHER PUBLICATIONS

Youngjoong et al "AutomaticText Categoriziation by Unsupervised Learning"; Department of Computer Science, pp. 453–45.*
William et al "Context–Sensitive Learning Methods for Text Categorization"; Apr. 1999; ACM Transaction on Information Systems, vol. 17, No. 2; pp. 141–173.*

* cited by examiner

Primary Examiner—Romain Jeanty
(74) Attorney, Agent, or Firm—Whitham, Curtis & Christofferson, P.C.; Stephen C. Kaufman

(57) ABSTRACT

Supervised learning is used to develop a computer program that can automatically route or respond to electronic communications assuming the existence of an appropriate formal scheme for categorizing incoming electronic communications. A method is described by which such a categorization scheme for electronic communications can be constructed. The method is based on an analysis of factors having an impact on the categorization scheme from both the business domain and the technology domain. The problem solved by this method is a new one that is only now emerging as automated methods of routing communications based on supervised learning are becoming feasible. Among other uses, this method may be practically employed as a disciplined way of carrying out consulting engagements that call for setting up and maintaining categorization schemes for electronic communications.

9 Claims, 8 Drawing Sheets

METHODOLOGY FOR CREATING AND MAINTAINING A SCHEME FOR CATEGORIZING ELECTRONIC COMMUNICATIONS

BACKGROUND OF THE INVENTION

1. Field of the Invention

The present invention generally relates to computer-assisted processing of electronic communications and, more particularly, to a method for categorization of electronic mail or other electronic communications based on the defined business processes, personnel skills and workflows of an organization receiving the communications.

2. Background Description

Much of today's business is transacted by reading electronic mail (e-mail), reports and other documents to gather the pertinent information to make informed business decisions. Customers require information on products and services. Many people are employed solely to read and respond to these customer requests and the money required to pay for this headcount is a large part of departmental budgets.

As customer expectations are set to receive information ever more quickly as a result of the ability to help oneself on the Internet, additional strain is placed on resource-limited companies. Often, the same information is requested repeatedly.

Many companies would like to find a way to address their customers' requests but at the same time they would like to reduce the time it takes to respond, to reduce headcount associated with answering these questions and to provide a consistent set of responses no matter the skill level of the people answering the requests for information. It is also important to transfer the knowledge and decision points from the experienced resources to new hires and less experienced personnel. Often, the method presently used to categorize and respond to the incoming electronic communications is incompletely defined, and the results of its use cannot be reliably repeated.

The current business practice for handling electronic communications is often to leave processing decisions to the discretion of the individual answering the communication. In general, the electronic communication enters a computer system run by the organization, it is reviewed by a human, possibly the communication is routed to other individuals, and when the proper respondent is reached, that person sends a response. Thus, electronic communications are not necessarily simply answered by the first person who sees them, although they might be, but they may be routed to a more appropriate respondent. At some point in the process, the electronic communication has a category attached to it to facilitate routing and response. Whatever action is taken is largely determined by how an electronic communication is categorized. The action taken is not entirely dependent on the assigned category only because of the reliance of human oversight.

Additionally, the attached category can be useful when and if an analysis of the workflow is undertaken. The categorization process is normally somewhat unstructured, although there may be informal written guidelines as well as a collection of response templates residing in a computer system that a person may use in handcrafting a computer-assisted response. The categories used may be imprecise and ambiguous, with the proper performance of the system depending on human intervention to resolve any problems that arise.

Referring now to the drawings, and in particular to FIG. 1, there is shown a high-level analysis of factors entering into current business practices for determining how to categorize electronic communications. Current business practice in this area has previously not been the subject of formal analysis. However, it is observed by the inventors that the development of the manual categorization scheme 100 is governed by two main elements:

1. the anticipated content 102 of the incoming electronic communication; and
2. a workflow analysis 104 of how the business should deal with various kinds of electronic communications. (Note: a workflow analysis determines where and how a particular electronic communication will be handled. It is based on the business mission 105, the skills of the people responding manually to the electronic communication 107, as well as any previously developed and stored responses 109.)

An ad hoc approach is currently used to develop the categorization scheme from these two elements.

One way to automate the routing and/or response to e-mail is, broadly speaking, to let a computer learn how to do the job of categorization. A specific means of letting the computer learn to do this job is to employ techniques in the area of machine learning called supervised learning. However, even with promising technology, in the absence of the right categorization scheme, "let a computer learn how to do the job" is only a slogan and not a solution. The best machine learning methods in the world cannot work if the categorization scheme does not match both the technology and the business needs simultaneously.

SUMMARY OF THE INVENTION

It is therefore an object of the invention to provide a methodology for creating and maintaining a categorization scheme for electronic mail or other electronic communications based on the defined business processes, personnel skills and workflows of an organization receiving the communications.

According to the invention, a categorization scheme is to be implemented using analysis of both the business domain of an organization and the technology domain of a computer-implemented categorizer. Current practice does not involve the disciplined integration of the two domains. Current practice also fails to incorporate the careful, new analysis of the two domains, in relation to the problem of categorizing electronic communications, that is found in this invention.

A first step is to analyze the business domain. The analysis of the business domain comprises the steps of:

1. Analyze the anticipated content of relevant electronic communications. Review the existing electronic communications to determine if the same questions are frequently asked. If they are, determine if those questions can be answered the same way each time.

2. Analyze business missions and goals as follows: Review the business model and determine the success criteria and measurements used to determine when the business is successful. Establish turnaround times for the electronic communications to support the business mission and goals. Determine the volume of electronic communications that come in daily and how many have to be answered to meet the business goals.

3. Evaluate the skills of involved personnel. Determine whether the customer service representatives (CSR) can answer the questions asked or provide the requested information directly. If not, determine if they forward the questions to a more experienced person or depend on the answer being provided to them.

4. Analyze the organization's workflow as follows: Determine the flow through the organization and routing performed on a category by category basis. Determine if subject matter experts (SME) have been established for the categories of information the people receiving the questions can't answer. Determine whether there is currently an automated or manual system for routing electronic communications.

5. Analyze the use of stored responses in the following manner: Determine whether answers have been developed for frequently occurring questions. Determine whether the CSRs add additional comments to stored responses before sending them to the customer.

6. Using the insight gained by the analysis of the business domain so far, produce business requirements to be used in the later validation phase.

The second step is to decide on an approach to machine learning in the form of a program or an algorithm that will be used to induce a categorizer using supervised learning. In supervised learning, the categorizer is generated from training data. which in this case will be a set of examples of the communications of the kind to be classified. In order to produce a categorizer, the items of training data will be labeled with categories from the category scheme produced by this invention.

The third step is to gather existing data. Foremost is the assembly of a pool, as large as possible, of representative examples of electronic communications. This data set will be needed in subsequent steps. Informal or ad hoc methods of labeling or classifying electronic communications may already exist, so all of these existing categorization schemes should be collected. Also, make inventories of personnel skills, business processes, workflows, and business missions.

The fourth step is to analyze the data. Examples of the electronic communications should be studied to gain an appreciation of the complexity, vagueness, and uniqueness to be expected in the communications to be categorized, as well as the relative numbers of various kinds of communications. The technical structure of the communications should be ascertained. An example of this kind of structure is the presence of special fields, e.g., containing a URL or a CGI query string, that may be likely to be relevant to categorization. The inventories of personnel skills, business processes, workflows, and business missions collected earlier provide the basis for obtaining a complete understanding of what must be done with an electronic communication, and by whom. In particular, both the extent to which different people necessarily handle clearly different kinds of communications and the extent to which a single person may handle communications of a variety of types should be clearly understood. This understanding will determine the level of granularity of the categorization scheme that is required by structure of the business.

The fifth step is to define a categorization scheme. The first phase here is to draw together lists of categories related to business groups, categories related to routing communications to specific individuals, categories of communications for which an automated response is feasible and desirable, and categories related to existing stored responses or stored templates for responses. The assembled categorization scheme should be then tempered by bringing to bear an analysis of what kinds of categorization are technically feasible. Knowledge of the technical structure of the communications should be correlated with knowledge of what kinds of features can actually be identified by the machine learning component. This will lead to conjectures about what kinds of categories are reasonable to consider for the categorization scheme, in light of the fact that the categories for which supervised learning is likely to be effective are those that are associated with distinctive vocabularies. If two categories are so similar that it is hard to come up with words that will frequently distinguish communications in one category from communications in the other, then those categories should probably be amalgamated. Also, very general categories are not likely to be good for supervised learning techniques, again because of the lack of a distinctive vocabulary. Finally, the categorization scheme should be considered in light of the amount of training data available. Categories with very few examples, as a guideline, say, less than 30, should be eliminated or combined with other categories because supervised learning is not likely to produce a categorizer that performs well on those categories.

The sixth step is to label examples of electronic communications with categories from the categorization scheme for use both as training data to be used in the supervised learning step and as test data. The labeled examples should resemble as closely as possible the data on which the induced categorizer will eventually be used. However, if perfectly matching training data is unavailable, it is possible to use instead other data that bears a close resemblance to the electronic communications to be ultimately categorized.

The seventh step is to use a computer program to convert the labeled data into a form suitable for subsequent processing, both for the purpose of machine learning and technical validation.

The eighth step is to use a computer program based on the supervised learning technology to induce a categorizer for the categorization scheme. This induction of the categorizer may involve some experimentation involving tuning parameters to improve performance. For instance, the particular algorithm used may use only a small set of values as feature counts, but exactly how many values are used may be setable. Similarly, specifying exactly what sections of a communication or document are used in training may be setable. If it is technically feasible and judged desirable (perhaps to compensate for known deficiencies in the training data), after the supervised learning algorithm has induced the categorizer, manual modification of the machine-generated categorizer may be done. For a rule-based categorizer, such manual modification may be accomplished by adding additional rules to categorize very important kinds of communications that were not adequately represented in the training data.

The ninth step is to validate the categorization scheme with respect to technical performance and business requirements. The technical performance criteria can be evaluated using a data test set, possibly consisting of data held back from the training set. This will involve using a computer program that uses the induced categorizer to predict the categories to which electronic communications belong. Also, in the context of the level of technical performance attained on various categories, the performance level of the categorization scheme with respect to business requirements must be judged. Finally, evaluate the overall performance of the categorization scheme by exercising on new data the entire system for processing electronic communications of which the categorization system is a part.

The tenth step is to implement the categorization scheme by putting the categorization system into production. The system should be monitored, documenting errors made and successes achieved.

The final step is to review and modify the categorization scheme, as required. The scheme should be reviewed regularly to consider its adequacy in the light of the latest distribution of communications. It should be modified to accommodate new business goals, and it may need to be changed to keep in step with changes in the supervised learning technology. If the categorization scheme must be changed, return to the sixth step to consider relabeling the data, and proceed from there.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

To develop the procedure for categorizing incoming electronic communications, supervised learning technology can be based on decision trees or on logical rules or on other mathematical techniques such as linear discriminant methods (including perceptrons, support vector machines and related variants), nearest neighbor methods, Bayesian inference, etc. Feature selection is included as part of supervised learning, for the following discussion.

Figure 1:
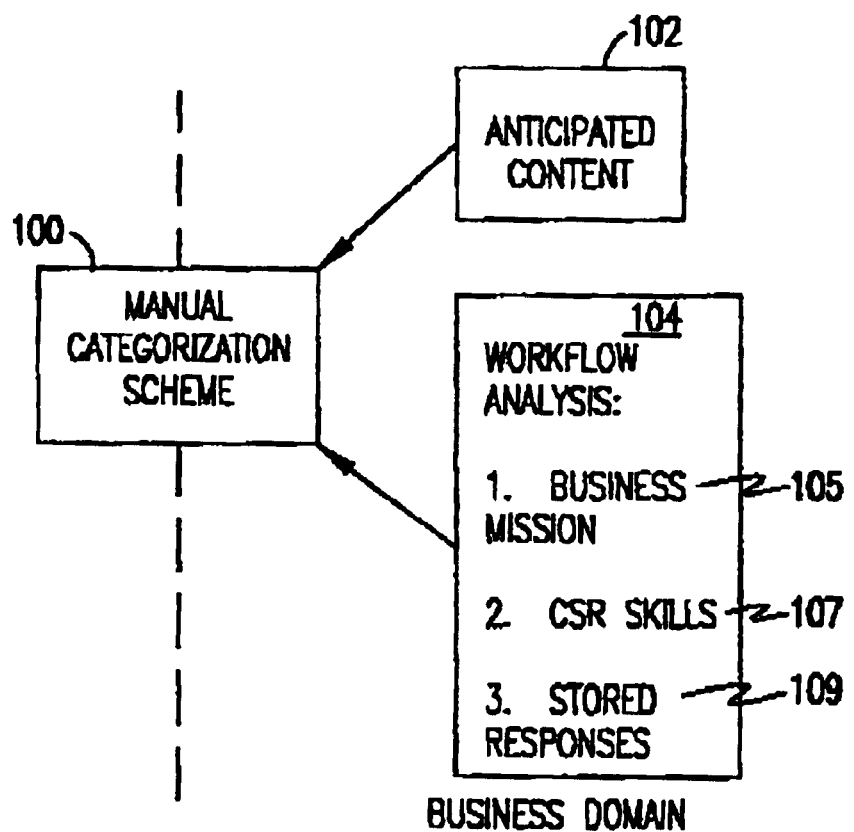
FIG. 1 shows a high-level analysis of factors entering into current business practices for determining how to categorize electronic communications.
Figure 2:
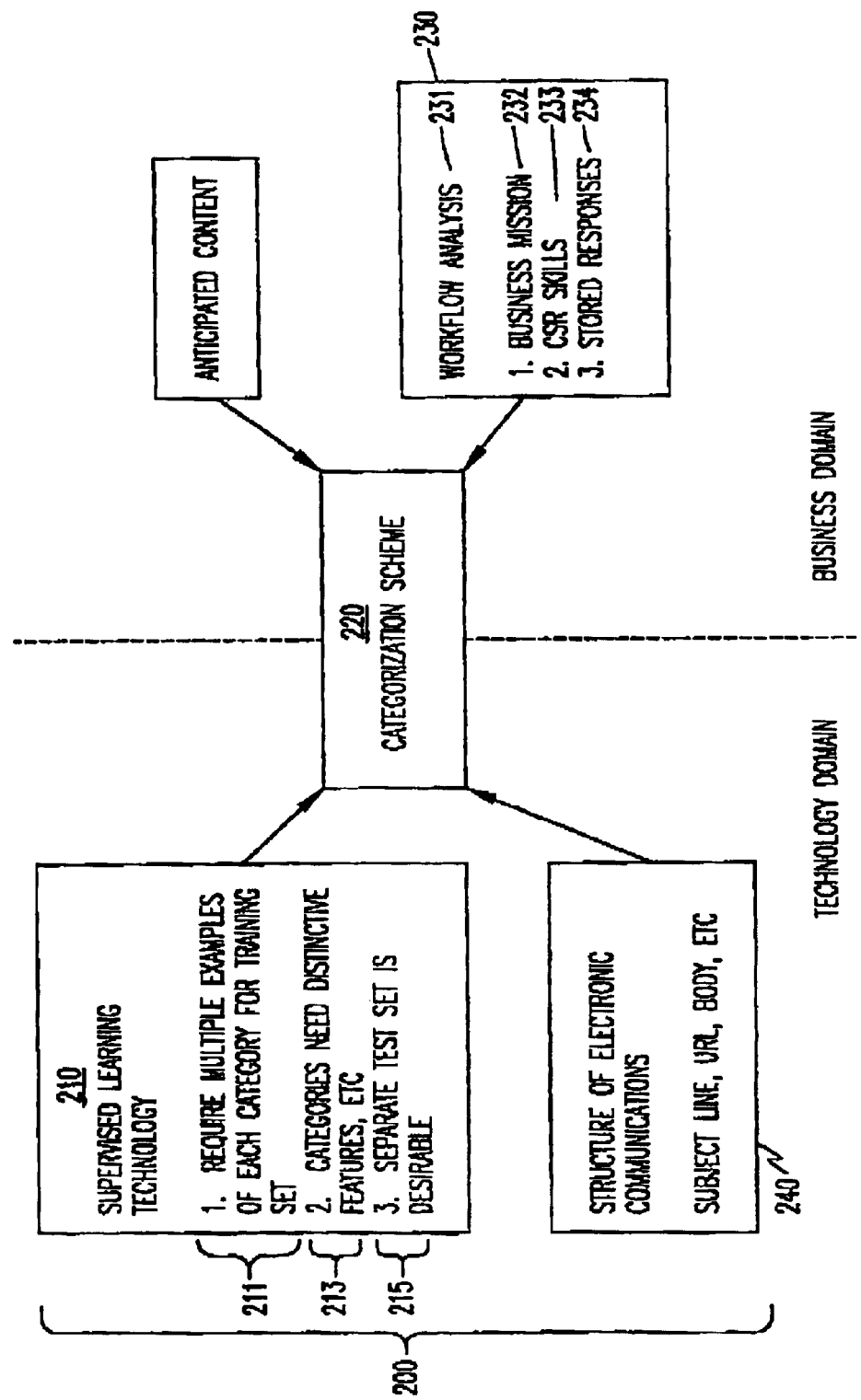
FIG. 2 illustrates a high-level analysis of additional factors that must be considered in constructing a categorization scheme that works well for automated response and routing of electronic communications using a categorizer constructed using supervised learning.

Referring again to the drawings, FIG. 2 illustrates a high-level analysis of additional factors that must be considered in constructing a categorization scheme that works well for automated response and routing of electronic communications using a categorizer constructed using supervised learning. The categorization scheme 220 is the key to linking the business domain 230 and the technology domain 200 for electronic communications. The business domain 230 contributes a workflow analysis 231, carried out in the context of the business mission 232 and an inventory of the available skilled personnel 233. Existing stored responses 234 are collated and analyzed with respect to content and business function. The technology domain 200 contributes the supervised learning engine and an analysis 210—in terms of content, structure, and processing—of the incoming electronic communication. The categorization scheme 220 brings the two domains together. One aspect of the present invention is this analysis of the structure of the problem.

Within each domain, there are contributing factors which must be considered before a practical categorization scheme is developed and implemented.

Supervised learning technology 200 requires a "training set" 211 of representations of previously categorized electronic communications to enable a computer to induce patterns that allow it to categorize future incoming electronic messages. Generally, there is also a "test set" 215 that is used to evaluate whatever specific categorization procedure is developed. In academic exercises, the test set is usually disjoint from the training set to compensate for the phenomenon of overfitting. In practice, if the data set is small, the only way to get really useful results may be to use all the-available data in both the training set. and the test set.

At the outset, the electronic communications in both the training set and the test set are represented in terms of numbers derived from counting occurrences of features 213. The relationship between features for the purposes of supervised learning and the text of a message has an important impact on the success of the enterprise, so it has to be addressed, but it is not part of supervised learning per se.

An example of an electronic communication might look like the following:

FROM: joe-user@where-ever.com

SUBJECT: TP 755 CD

REFERRED-FROM: www.ibm.com

TEXT: I erased the hard drive on my 755 CD and now I want to reload windows. Any suggestions?

If a category or categories, such as

ThinkPad, were associated with the above communication, then one would have a data item suitable to be an item of training data. For the purpose of inducing a categorizer, the FROM field is irrelevant. In the SUBJECT field, after tokenization and stemming, three tokens would be identified:

Tp 755 CD and in the TEXT field, after tokenization and stemming, there would be 17 tokens:

I erase the hard drive on my 755 CD and now want to reload window any suggestion each occurring once, except for "I" which occurs twice. The REFERRED-FROM field is different, being a URL, and so should be tokenized differently from the other fields, yielding, after tokenization and stemming, a single token www.ibm.com Note that the periods in the last case were not regarded as separators. Each token in each section would be regarded as a distinct feature. Using a transparent notation, 21 features are identified:

| SUBJECT\|TP | SUBJECT\|755 | SUBJECT\|CD |
|---|---|---|
| TEXT\|I | TEXT\|erase | TEXT\|the |
| TEXT\|hard | TEXT\|drive | TEXT\|on |
| TEXT\|my | TEXT\|755 | TEXT\|CD |
| TEXT\|and | TEXT\|now | TEXT\|want |
| TEXT\|to | TEXT\|reload | TEXT\|window |
| TEXT\|any | TEXT\|suggestion | |
| REFERRED-FROM\|www.ibm.com | | |

The counts associated with each feature would all be 1 except the count associated with the feature TEXT|I would be 2. Hence, the vector would represent this document, with the understanding that the order of the counts corresponds to the order of the features as listed above. In actuality, in processing the training data, the system for categorizer induction would likely encounter thousands of features, and each electronic communication would contain only a small number of them, so that sparse vectors would represent documents. The reader should keep in mind that the analysis just given is only meant to be an example of typical case of feature analysis. For instance, a sophisticated system might recognize windows in the context of this communication as being the name of a family of operating systems, to be recognized in this instance as an occurrence of a special token, e.g., Microsoft Windows®

At any rate, the details of tokenization, stemming, section recognition, etc., could vary while still remaining in the spirit of this method.

When the data is based on text, as in an electronic communication 240, the initial representations in terms of features are often too complicated for a computer to handle. There are usually too many features, and some distillation is needed. So, after the training set is prepared, a list of those features deemed particularly relevant to categorization is typically extracted automatically. The features in this list are referred to as the "selected features", and the process of building the list is referred to as "feature selection". There is an issue in regard to whether a single list of features, or a global dictionary, is created during feature selection, or whether there is a separate list for each category, referred to as local dictionaries. The resolution of this issue can depend on the details of the supervised learning technique employed, but in applications related to text, local dictionaries often give better performance. There are a variety of criteria for judging relevance during feature selection. A simple one is to use absolute or normalized frequency to compile a list of a fixed number of the most frequent features for each category, providing for the fact that small categories may be so underpopulated that the total number of features in them may be less than the threshold. More sophisticated techniques involve the use of information-theoretic measures such as entropy or the use of statistical methods such as principal component analysis. The premise behind feature selection is that the occurrence of selected features in incoming electronic communications will suffice for developing a sophisticated pattern recognition system to assign one or more categories to the communication.

After feature selection, a new representation of each electronic communication in the training data is then extracted in terms of how frequently each selected feature occurs in that item. From these new representations, the computer induces patterns that characterize when an electronic communication belongs to a particular category. The term "pattern" is meant to be very general. These patterns may be presented as rules or in other formats. Exactly what constitutes a pattern depends on the particular machine learning technology employed. To use the patterns to categorize incoming electronic communications, the newly arriving data must not only undergo initial processing so as to obtain a representation in conformance with the format of the training data 211, but it must then undergo further re-representation based on the list of selected features 213, so that it is finally represented in a way that permits the presence or absence of the computed patterns to be determined.

The assignment of more than one category to an item is called "multiple categorization". The requirement of support for multiple categorization should enter into the consideration of the specific machine learning program to be employed for applications involving categorization of text. Some techniques (for example, some approaches using decision trees) make the assumption that each item categorized will belong to at most one category. This is not desirable from the standpoint of categorizing electronic communications. Some supervised learning systems may return a ranked list of possibilities instead of a single category, but this is still slightly deficient. Such a system might assign categories even to documents that should be placed in no category. A better supervised learning method gives realistic confidence levels with each assigned category. These methods providing confidence levels are the most flexible of all, and they provide additional information for a business to use in determining how to handle each incoming message.

Multiple categorization allows classification of an electronic communication containing several topics into each relevant category. This eliminates the manual method of choosing only one category and placing the communication there. Two problems can arise from this:

1. Randomness can be introduced when different people categorize the communication differently depending on the topic they choose.
2. Errors could be introduced into the business metrics used to determine, for example, how many communications were received on a specific product.

By automatically categorizing the communication under all of the appropriate topics, the business metrics maintain their accuracy and the communication is consistently linked to the same categories.

The preferred embodiment of the present invention focuses on the steps that must be taken to create a categorization scheme 220 that is a prerequisite to using supervised learning technology effectively to assist in handling electronic communications. For purposes of the following description, electronic communication means both ordinary e-mail and web-mail (communication via the World Wide Web); however, it is not intended to exclude any form of electronic communication. A category scheme includes flat category schemes in which the categories are not related by subsumption, as well as hierarchical category schemes in which some categories subsume other categories. Identification of which categories are logically disjoint from one another is part of the creation of a category scheme. Whether or not the identification of mutually disjoint categories is of use to the supervised learning engine, it is likely to be useful in deciding on the proper handling of electronic communications. The initial categorization scheme is prepared manually.

Figure 3:
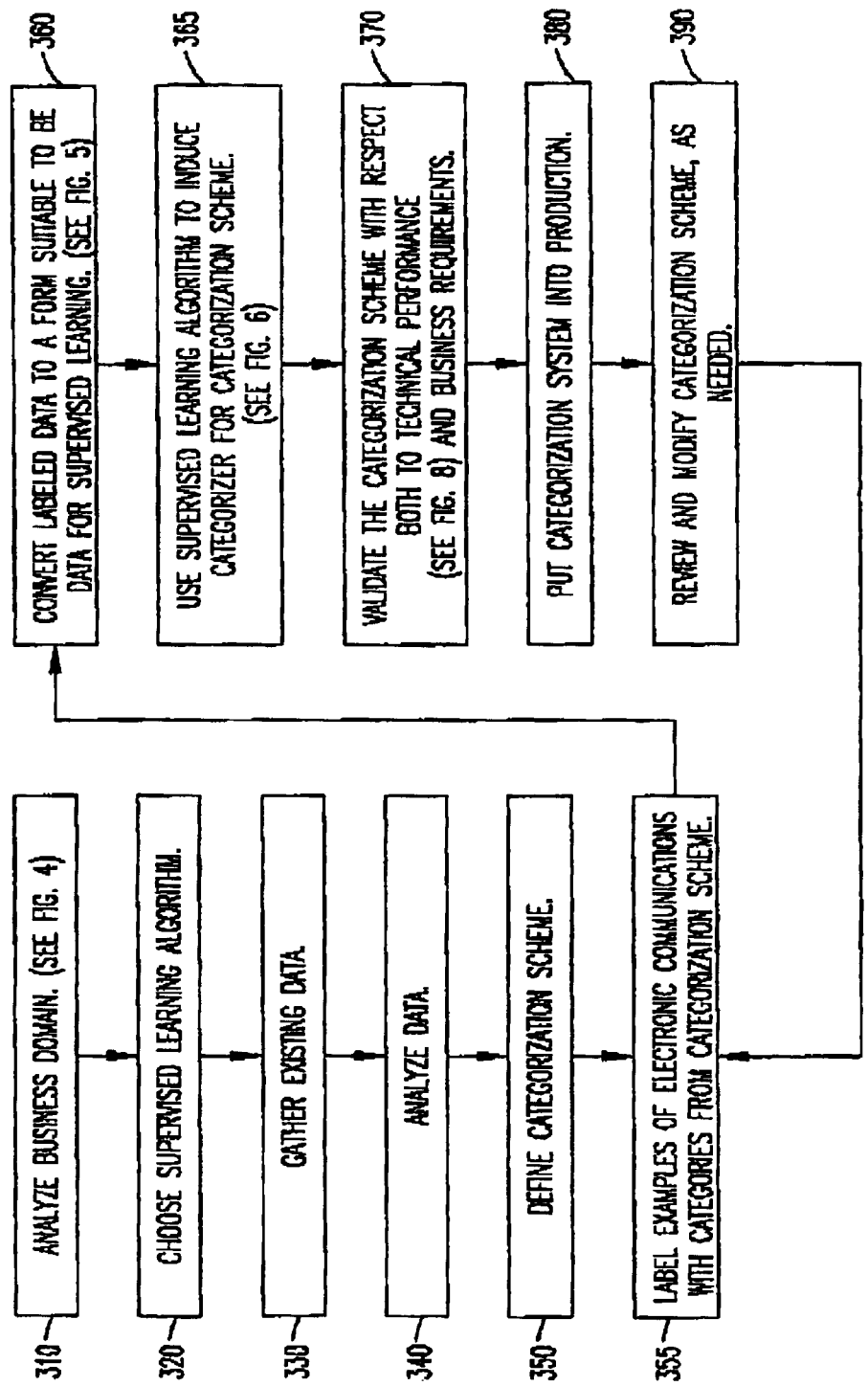
FIG. 3 shows a flow chart of the steps to be followed in for constructing a categorization scheme suitable for use with supervised learning technology, according to the present invention.
Figure 4:
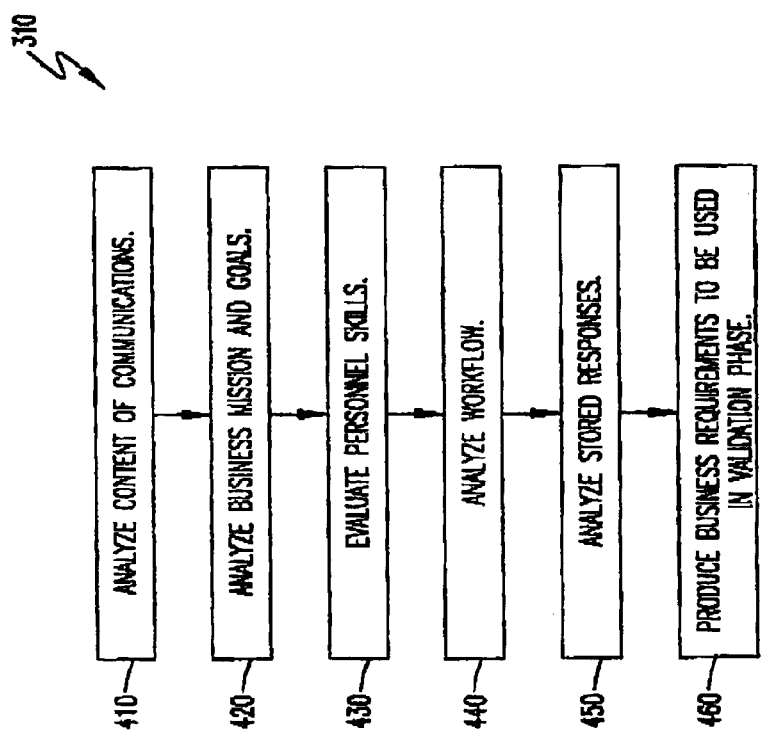
FIG. 4 illustrates the steps to be taken for analyzing the business domain.

Referring again to the drawings, in particular to FIG. 3, there is shown a flow chart of the steps to be followed for constructing a categorization scheme suitable for use with supervised learning technology. The first step 310 is to analyze the business domain. Referring now to FIG. 4, there is shown a flow diagram further describing the analysis of the business domain. The analysis of the business domain further comprises the steps of:

1. analyzing the anticipated content of relevant electronic communications 410; and reviewing the existing electronic communications to determine if the same questions are frequently asked. If they are, determining if those questions can be answered the same way each time.

2. analyzing business missions and goals 420 as follows: Review the business model and determine the success criteria and measurements used to determine when the business is successful. Establish turnaround times for the electronic communications to support the business mission and goals. Determine the volume of electronic communications that come in daily and how many have to be answered to meet the business goals.

3. Evaluate the skills of involved personnel 430. Determine whether the customer service representatives (CSR) can answer the questions asked or provide the requested information directly. If not, determine if they forward the questions to a more experienced person or depend on the answer being provided to them.

4. Analyze the organization's workflow 440 as follows: Determine the flow through the organization and routing performed on a category by category basis. Determine if subject matter experts (SME) have been established for the categories of information the people receiving the questions can't answer. Determine whether there is currently an automated or manual system for routing electronic communications.

5. Analyze the use of stored responses 450 in the following manner: Determine whether answers have been developed for frequently occurring questions. Determine whether the CSRs add additional comments to stored responses before sending them to the customer.

6. Using the insight gained by the analysis of the business domain so far, produce business requirements 460 to be used in the later validation phase.

Referring again to FIG. 3, the next step 320 for constructing a categorization scheme is to decide on an approach to machine learning in the form of a program or an algorithm that will be used to induce a categorizer using supervised learning. In supervised learning, the categorizer is generated from training data. which in this case will be a set of examples of the communications of the kind to be classified. In order to produce a categorizer, the items of training data will be labeled with categories from the category scheme produced by this invention. The criteria affecting the suitability of the machine learning component are:

the ability of the machine learning component to process data effectively derived from electronic communications containing text, where the data representations are normally vectors of high dimensionality, the potential of the machine learning component to produce a categorizer whose performance as measured by precision, recall, and/or accuracy indicated likely utility in a business setting, and a determination of whether it is critical to have a capability to extend or modify a machine-generated categorized by manual means in order to cover gaps due to the absence of particular kinds of training data.

In the experience of the inventors, machine learning programs based on symbolic rule induction are likely to be good candidates according to all of these criteria. However, while machine learning programs based on boosted decision trees, or based on support vector machines, or based on techniques involving regularizing approaches to supervised learning such as least squares fit, logistic regression, or related methods are good according to the first two criteria, and may be employed if it is determined that the third criterion is not critical.

The next step 330 is to gather existing data. Foremost is the assembly of a pool, as large as possible, of representative examples of electronic communications. This data set will be needed in subsequent steps. Informal or ad hoc methods of labeling or classifying electronic communications may already exist, so all of these existing categorization schemes should be collected. Also, make inventories of personnel skills, business processes, workflows, and business missions.

The next step 340 is to analyze the data. Examples of the electronic communications should be studied to gain an appreciation of the complexity, vagueness, and uniqueness to be expected in the communications to be categorized, as well as the relative numbers of various kinds of communications. The technical structure of the communications should be ascertained. An example of this kind of structure is the presence of special fields, e.g., containing URL or a CGI query string, that may be likely to be relevant to categorization. The inventories of personnel skills, business processes, workflows, and business missions collected earlier provide the basis for obtaining a complete understanding of what must be done with electronic communication, and by whom. In particular, both the extent to which different people necessarily handle clearly different kinds of communications and the extent to which a single person may handle communications of a variety of types should be clearly understood. This understanding will determine the level of granularity of the categorization scheme that is required by structure of the business.

The next step 350 is to define a categorization scheme. The first phase here is draw together lists of categories related to business mission groups, categories related to routing communications to specific individuals, categories of communications for which an automated response is feasible and desirable, categories related to existing stored responses or stored templates for responses. The assembled categorization scheme should be then tempered by bringing to bear an analysis of what kinds of categorization are technically feasible. Knowledge of the technical structure of the communications should be correlated with knowledge of what kinds of features can actually be identified by the machine learning component. This will lead to conjectures about what kinds of categories are reasonable to consider for the categorization scheme, in light of the fact that the categories for which supervised learning is likely to be effective are those that are associated with distinctive vocabularies. If two categories are so similar that it is hard to come up with words that will frequently distinguish communications in one category from communications in the other, then those categories should probably be amalgamated. Also, very general categories are not likely to be good for supervised learning techniques, again because of the lack of a distinctive vocabulary. Finally, the categorization scheme should be considered in light of the amount of training data available. Categories with very few examples, as a guideline, for example, 30, should be eliminated or combined with other categories because supervised learning is not likely to produce a categorizer that performs well on those categories.

The next step 355 is to label examples of electronic communications with categories from the categorization scheme for use both as training data to be used in the supervised learning step and as test data. The labeled examples should resemble as closely as possible the data on which the induced categorizer will eventually be used. However, if perfectly matching training data is unavailable, it is possible to use instead other data that bears a close resemblance to the electronic communications to be ultimately categorized.

Figure 5:
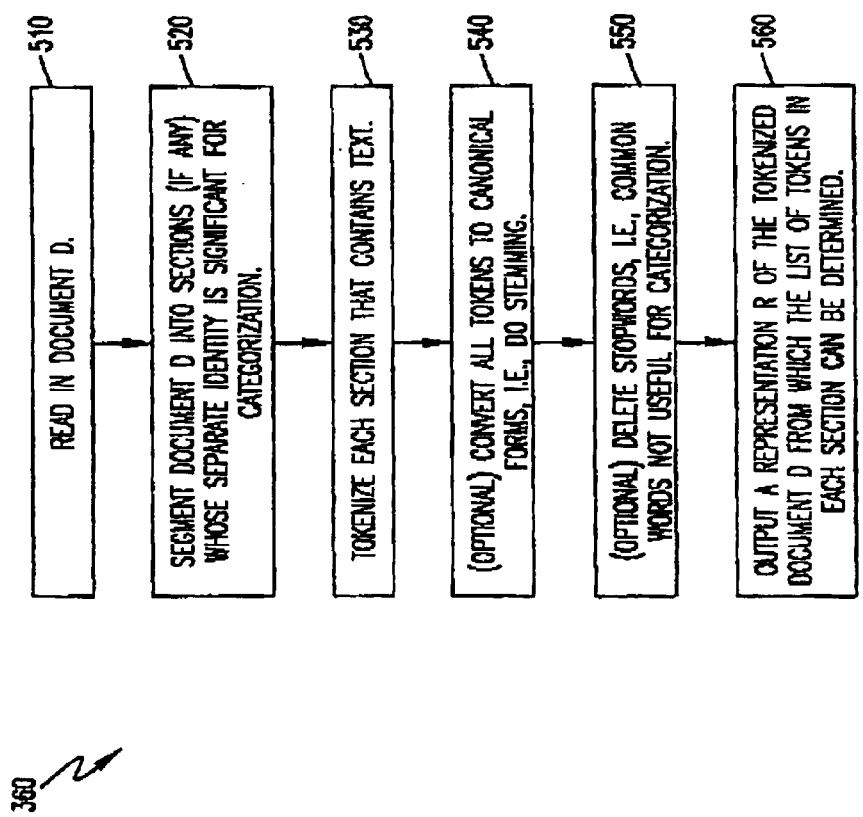
FIG. 5 is a flow chart of a procedure for converting an electronic communication to a form suitable to be data used for supervised learning, as well as for categorization by a categorizer induced by a typical supervised learning algorithm.

The next step 360 is to use a computer program to convert the labeled data into a form suitable for subsequent processing, both for the purpose of machine learning and technical validation. Referring now to FIG. 5, there is shown a procedure for converting an electronic communication to a form suitable to be data used for supervised learning. First, a document d is read in block 510. The document d is segmented into sections 520, if any, whose separate identity is significant for categorization. Each section containing text is then tokenized in block 530. Optionally, all tokens are converted to canonical forms, i.e., perform stemming, in block 540. Stopwords are optionally deleted in block 550. A stopword is a common word not useful for categorization. A representation r of the tokenized document d from which the list of tokens in each section can be determined is then output in block 569.

Referring again to FIG. 3, the next step 365 is to use a computer program based on the supervised learning technology to induce a categorizer for the categorization scheme. This induction of the categorizer may involve some experimentation involving tuning parameters to improve performance. For instance, the particular algorithm used may use only a small set of values as feature counts, but exactly how many values are used may be setable. Similarly, specifying exactly what sections of a communication or document are used in training may be setable. If it is technically feasible and judged desirable (perhaps to compensate for known deficiencies in the training data), after the supervised learning algorithm has induced the categorizer, manual modification of the machine-generated categorizer may be done. For a rule-based categorizer, such manual modification may be accomplished by adding additional rules to categorize very important kinds of communications that were not adequately represented in the training data.

Figure 6:
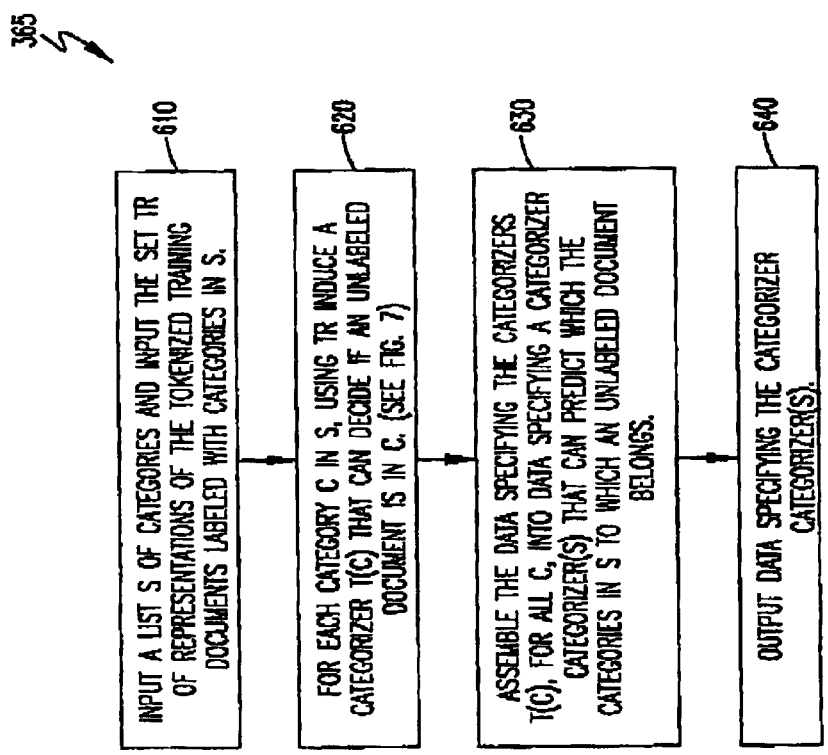
FIG. 6 is a flow chart for a procedure for supervised learning of a categorizer for a categorization scheme S using training data labeled with categories from S.

Referring to FIG. 6, there is shown a procedure for supervised learning of a categorizer for a categorization scheme S using training data labeled with categories from S. A list S of categories and the set TR of representations of the tokenized training documents labeled with categories in S are input in block 610. For each category C in S, TR is used to induce a categorizer T(C) that can decide if an unlabeled document is in C, in block 620, as shown in detail in FIG. 7.

Figure 7:
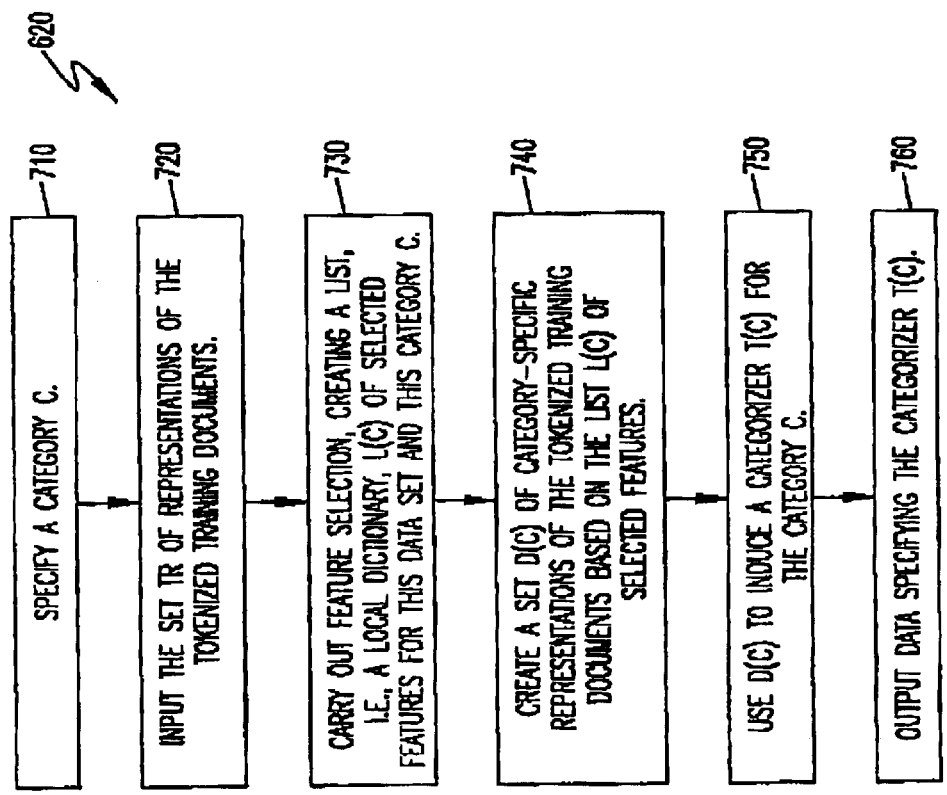
FIG. 7 is a flow chart for a procedure for supervised learning of a categorizer for a single category C using training data labeled with categories from a categorization scheme.

Referring now to FIG. 7, there is shown a procedure for supervised learning of a categorizer for a single category C using training data labeled with categories from a categorization scheme. First a category C is specified in block 710. The set TR of representations of the tokenized training documents is input in block 720. Feature selection is performed in block 730, creating a list (i.e., a local dictionary) L(C) of selected features for this data set and this category C. A set D(C) of category-specific representations of the tokenized training documents is created in block 740, based on the list L(C) of selected features. The category-specific representations D(C) are used to induce a categorizer T(C) for the category C, in block 750. Data specifying the categorizer T(C) is output in block 760.

Referring again to FIG. 6, data specifying the categorizers T(C) for all C are assembled into data specifying a categorizer Categorizer(S) that can predict which the categories in S to which an unlabeled document belongs, in block 630. Data specifying the categorizer Catgorizer(S) is output in block 640.

Figure 8:
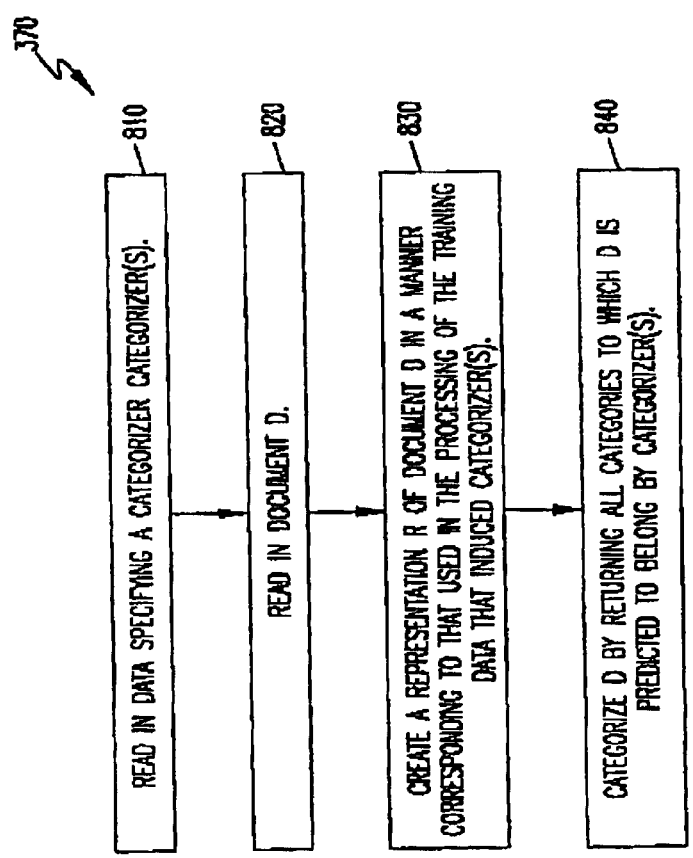
FIG. 8 is a flow chart for a procedure for using a categorizer, Categorizer(S), induced by supervised learning, to predict those categories in a categorization scheme S to which an unlabeled electronic communication (document d in the flow chart) belongs.

Referring again to FIG. 3, the next step 370 is to validate the categorization scheme with respect to technical performance and business requirements. The technical performance criteria can be evaluated using a data test set, possibly consisting of data held back from the training set. This will involve using a computer program that follows the flow chart depicted in FIG. 8 to use the induced categorizer to predict the categories to which electronic communications belong. Referring to FIG. 8, there is shown a procedure for using a categorizer Categorizer(S), induced by supervised learning, to predict those categories in S to which an unlabeled electronic communication (document d) belongs. Data is read in specifying a categorizer Categorizer(S) in block 810. Document d is read in block 820. A representation r is created of document d in a manner corresponding to that used in the processing of the training data that induced Categorizer(S), in block 830. Document d is then categorized by returning all categories to which d is predicted to belong by Categorizer(S), in block 840. In the context of the level of technical performance attained on various categories, the performance level of the categorization scheme with respect to business requirements must be judged. Finally, the overall performance of the categorization scheme is evaluated by exercising on new data the entire system for processing electronic communications of which the categorization system is a part.

Referring again to FIG. 3, the next step 380 is to implement the categorization scheme by putting the categorization system into production. The system should be monitored, documenting errors made and successes achieved.

The final step 390 is to review and modify the categorization scheme, as required. The scheme should be reviewed regularly to consider its adequacy in the light of the latest distribution of communications. It should be modified to accommodate new business goals, and it may need to be changed to keep in step with changes in the supervised learning technology. If the categorization scheme must be changed, return to the sixth step to consider relabeling the data, and proceed from there.

Business Domain

The business mission must be well understood to develop a meaningful categorization scheme. Thus, the first step is to gather data regarding the organization. The business mission will determine the level of detail and complexity required. For example, if the business mission requires sending a very specific response to a very technical question within a short time frame, the categorization scheme must support a sufficient level of detail for a successful first hit. If only a general reply is required, the demands on the category determination are much less stringent. The categorization engine must be robust enough to support more or less detailed categories.

The skill levels of the personnel who execute the day-to-day operations also have an impact on the development of the categorization scheme. Many businesses will want to use a tiered approach to answering their electronic communications. A first-level generalist may act as a filter and answer as many e-mails as possible before passing to the second or third tier specialists. The category assigned to an incoming communication should facilitate and not hinder such a transfer. This type of hand-off reflects both skill sets and workflow. The linkage between the two must be understood to develop a categorization scheme that is truly functional in a business environment. Thus, the data gathered is now analyzed in light of defining a categorization scheme for electronic communications.

Proper execution of the workflow analysis when developing the categorization scheme involves the following steps:

1. Review the personnel assignments in the light of the business mission and the skills of individuals.
2. Understand how to use skilled resources to direct the electronic communication to a specialist if additional expertise is required.
3. Understand how to use skilled resources to develop responses to the electronic communication that keep customer satisfaction high and advance the business goals.
4. Understand the key decision points required to determine whether additional support is necessary, whether routine answers can be provided, or whether a custom answer is required.
5. Understand when and how to capture the routing information for automating the responses or forwarding to the specialist.
6. Maintain the lowest level of complexity required to respond efficiently to the communications and still meet the business goals.
7. Develop a tentative initial categorization scheme 305 based on areas receiving the largest number and most important communications so efforts can be directed toward those areas providing the biggest impact on the business.
8. Finally, for realistic use in a business setting, a requirement is that the categorization scheme be conceived with the realization that many electronic communications will of necessity be assigned more than one category. Thus, multiple categorization is common in this domain. The different categories may be of entirely different kinds (employee inquiry vs. customer inquiry, one product vs. another product), or they may both be of the same general kind (as when a bank customer inquires about different services, e.g. a credit card application and how to open a money market account, in the same message).

In particular, sensitivity to multiple categorization—when it can happen and what else might happen when it does—is one way in which the workflow analysis and must be done more carefully to support automated routing and response than in the case of a system based solely or mostly on human response. This increased sensitivity pays off not only in a higher level of correct response, but it has the potential for better tracking of electronic communications for report generation purposes.

Technology Domain

There are three issues that should be considered when using supervised learning technology for text categorization. The first two issues, data set size and distinctivity of categories, are technical factors affecting performance. The third, technical validation of results, pulls everything together. The results of validation must be considered in the context of the technology in order to figure out what corrective action can bolster results that do not meet expectations.

Data Set Size: The most obvious requirement of supervised learning technology is that there be enough training data for the task at hand. How much training is enough will be discussed later. However, this means that the development of a categorization scheme should not be undertaken independently of the analysis of the training data, although there is a great temptation to do so. In practice, a revision of an initial categorization scheme may be necessary on the basis of the number of examples of a category in the training data assembled.

Distinctivity of Categories: For any existing data set, labeled with any categorization scheme, it is desirable to have the supervised learning technology select the most relevant features and, on that basis, find the patterns, or rules, that can be used to classify, or categorize, new data. This simply can't always be done, as in the extreme and hopefully unrealistic case of when the data is labeled randomly. Eventual success is likely so long as before the supervised learning engine begins pattern induction, features are found that are likely to be distinctive of the categories of interest. Such features could be the basis of patterns constructed by hand. An evaluation of the performance of hand-constructed patterns for categorizing data can provide a lower bound on the expected performance of a supervised learning engine, although such an evaluation would be done seldom, if ever, in practice. More importantly, the existence of such category-specific, distinctive features provides some assurance that the categories being used are suitable for supervised learning.

From a technical point of view, the use of supervised learning technology takes the categorization scheme as a given. If the implemented categorization scheme is poorly chosen, then the training data may have to be relabeled according to a revised categorization scheme in order for the results to be satisfactory. Any time the categorization scheme is revised, relabeling of the data must be revisited. Thus, when revision is necessary, revisions that simplify relabeling, such as amalgamating existing categories, should be considered first.

Technical Validation: Assuming an independent data set is reserved as test data, consideration should be given to how the data set is split between the test data set and the training data set. Normally, one should be convinced that there should be no difference between them outside of the difference that comes from drawing samples from the same distribution.

Sometimes, in academic exercises, one splits the data using a point in time to divide training from test data, taking the early data as training data and the later data as the test data, with one idea being that one would like to examine how bad things get when the subject matter of the text drifts over time, as usually it does. In the context of getting the best results for business, retraining regularly is the best way to adjust for the changing character of messages. So, in the business setting, forming a data set by taking the most recent labeled data available and then randomly selecting both training and test data from it is the best way to proceed.

Academic exercises seem to keep half or one-third of the data for testing. This is very conservative. Empirically speaking, less test data seems to be adequate for most business purposes. In fact, after one is convinced that one is on the right track in a practical setting, any time that data is scarce, it is practical to use everything as training data.

When validation shows that results don't meet expectations, there are three immediate options for correction. The simple option, but possibly adequate, is to get more data. Another option is to fix mislabeled data on hand, retaining the existing categorization scheme. The option that takes more cognitive effort is to rethink the categorization scheme in the light of the technology, keeping in mind the feasibility of relabeling the data.

Content: Of course, just as in a system where humans do the categorizing, the anticipated content of the message does matter because the actual categories chosen must relate to business needs and those categories are expected to be populated with real messages. However, anticipating the content also includes anticipating the language (e.g., Chinese or French) or dialect used (e.g., American English or British English). Although in practice, the dialect is not likely to be significant, it cannot be ruled out a priori. Thus, content analysis involves consideration of the technical consequences of the specific natural languages employed. For instance, the following questions are pertinent during analysis 303:

Is language identification as a kind of categorization crucial to the application?

Can electronic communications in different languages be mixed together?

Structure: A more subtle aspect of the electronic communication is its structure from the point of view of the computer. The structure of the electronic communication is important for developing the categorization scheme because different parts of the communication can be used differently by the supervised learning engine. Electronic communications can come from a variety of sources, including the Internet, an intranet, external e-mail sources, etc. The communications may or may not have attachments that are structured documents themselves. Attachments may or may not be MIME-encoded. One issue is whether attachments should be disregarded for the purposes of supervised learning. In the opinion of the inventors, in general, attachments should be disregarded because of their unpredictable internal structure. Each source may or may not have relevant formatting idiosyncracies. In this case, differences in formatting as reflected in features should probably not be identified for supervised learning, but the inventors have not fully explored this issue. In all likelihood, the differences will be ironed out or uniformly codified by the processing described below.

Processing: One important issue is the relationship between the text of an electronic message and features of the message identified for the purposes of supervised learning. This matter did not need to be addressed in the prior art where humans do the categorization. The features to be used in supervised learning applied to categorizing electronic messages are likely to be derived from words and word-like constructs, such as URL's and e-mail addresses, that appear in the messages. It is beyond the capability of current technology to do anything approaching a deep analysis of the true meaning of the messages, at least a human would understand "true meaning." Moreover, even assigning parts of speech to words has not been shown to be useful yet for the categorization of electronic communications. Further, assigning parts of speech to words is not entirely simple, either. In the future, other methods of feature extraction may turn out to be useful.

Basic decisions about data preparation must be made to be consistent with the choice of supervised learning technology to be employed. These decisions affect the relationship between words found in text and features identified for the purposes of supervised learning. Thus, these decisions should be taken into account when the categorization scheme is created. These decisions are implemented in the computer program or programs that convert an electronic message into the training data format. For instance, a computer must invariably process the e-mail to the extent that, minimally, the sections of the e-mail are identified and the contents of the sections are broken into tokens where appropriate. Perhaps each occurrence of a word in an electronic communication is recorded with an annotation with the section in which occurs. The inventors have found that pairing word occurrence with message sections is likely to be useful, though it can greatly expand the feature space. Whatever is done, this data preparation must be broadly understood, although it is not necessary to do so at the level of the code that implements it. One must always keep in mind that similar data preparation will have to be done to incoming electronic communications in order to have a computer categorize them.

Specific Issues in the Analysis: The specific key considerations derived related to the content, structure, and processing of the electronic communications are:

1. Electronic communication must be consistently structured—and meet specified standards. While this statement seems obvious and easy to achieve, for many businesses, the webforms used to generate the incoming electronic communications are not consistent or standardized. Individual groups post webforms structured to provide information optimized for their specific needs. Many companies have not instituted corporate standards for the output from their web pages. In order to use supervised learning, a consistent structure either must be instilled on the output from the webform from the start or else it must be imposed subsequently by a transformation program before transferring the communication to the supervised learning application.

2. Electronic communication must be structured so that different parts can separately processed, when this is appropriate. For instance, different parts of e-mail may be tokenized differently. Text containing a URL of a website that is the source of a communication may well be tokenized differently from text containing ordinary natural language. Different parts, such as the subject and body may be separated for different handling at some stage of the machine learning process. In particular, realize that the incoming address or source website can be used as information affecting categorization.

3. It should be understood in broad terms how the results of processing the various parts of an electronic communication would be recombined to form a representation of a document that is suitable for machine learning. For instance, if word order becomes irrelevant in the representation of a message for machine learning purposes, then this should be understood.

4. How do individual tokens found in a message relate to features that are relevant to machine learning? Specifically, consider the following issues:

(a) Are multi-word tokens recognized, or do tokens consist only of single words? If multi-word tokens are recognized, is it still true that each word in the text can be related to at most one token extracted? The inventors recommend using multi-word tokens, if possible.

(b) Are words stemmed, i.e., replaced by a standard form, as in changing recognized plural words to corresponding singular forms, in the course of tokenization? If stemming is done, is it done by using a dictionary or is it done by a computer program implementing simple heuristics, such as deeming any unrecognized word ending in "s" to be a plural? If a dictionary is used, what happens to words not in the dictionary? The inventors recommend using the most sophisticated stemmer available.

(c) Are abbreviations, monetary amounts, dates, proper names, or addresses handled in any special way? The inventors recommend using the most sophisticated methods available for extracting these kinds of features.

(d) Is a so-called "stopwords" list used to remove common words that are deemed beforehand—perhaps rashly—to have no effect on categorization? For instance, the inventors have seen the common word "as" turn up as a significant feature in email dealing with AS400 computers and "it" can be a significant component of an address because it is a standard abbreviation for Italy. However, it is true that most of the time most stopwords can be harmlessly removed from most messages with the positive result of shrinking the feature space. The inventors recommend not removing stopwords in most instances. If the feature selection program is effective, it will serve to filter out common words that are not relevant to categorization while retaining those that are relevant.

In summary, the analysis of incoming electronic communications is important both at a high level and at the level of understanding of how messages will be processed to convert them into a format suitable for supervised learning. At the high level, it is essential to validating the categorization scheme in terms of the business mission. At the lower level, it is the key to understanding the detailed relationship between words and word-like constructs, on one hand, and features that are the basis of pattern recognition, on the other hand.

As described above, it is seen that development of a practical categorization scheme to be used for automating the response and direction of incoming electronic communications requires insight from both the technology and business domains.

The categorization scheme developed by the skilled resources must be reviewed with respect to the constraints from the technology domain and practical business implications. These considerations include:

1. It should be plausible that there are distinctive vocabularies for each category chosen as important to the business. This is because of the direct connection between words and features. When possible, experiments validating distinctiveness should be run in cases of doubt. If the supervised learning engine is rule-based, then these experiments can be done by evaluating the performance of handwritten rules of the form $$\text{feature} > 0 \rightarrow \text{category},$$

which asserts "classify the item as being in the category if the feature is present."

2. An adequate number of examples are needed for each category for which one expects rules. It has been found empirically that for a rule-based categorizer, one needs a minimum of 30+ examples of typical e-mail categories to get any rules at all. Normally, 50 examples are desirable for good performance. In rare instance, 20 will work when there are few labeling errors in the training data, and the category is very cleanly separated from the others. These numbers do not have theoretical justifications, but are instead based on experience dealing with categorizing text from a number of sources and using several varieties of supervised learning 3. One should not be alarmed if a small number of the categories (i.e., three (3)) cover more than half of the data. This seems to happen in practice with, for example, e-mail and news stories. A few supervised learning methods can have difficulty with lop-sided distributions, but others take them in stride. The methods that have difficulty with lop-sided distributions would probably be ruled out for other reasons. Of course, if some simple reconsideration of the category scheme leads to a more balanced distribution, then it should be used, as long as using it does not do violence to some other principle.

4. Categories should not be so small and specific that they lose meaning in a business context.

5. One should develop a strategy for handling categories that are absolutely required for business purposes but have not generated enough electronic communications to satisfy other requirements. If the supervised learning engine is rule-based, it may be possible to handle such categories with handwritten, rather than machine-generated, rules.

6. For the most part, one should develop distinct categories only when required to perform a separate action since similar actions on different categories may not have a real business purpose. However, if two truly distinct categories, as measured by having definitely distinctive vocabularies, are handled in the same way, then it is preferable to keep them apart. Some small experimentation might be in order to see what works best in this case.

7. Skills of the personnel answering the electronic communications must match the categorization scheme developed.

8. One should be wary of categories called "general" or "miscellaneous." Even if these categories are not otherwise suspect, they may not yield proficient rules because of the difficulty of finding a criterion that distinguishes miscellaneous items for non-miscellaneous items. However, experience indicates that these categories may contain many mislabeled items, or at least items likely to confuse the supervised learning engine. A mislabeled item is taken to be an actual counterexample to category membership, so the supervised learning engine might bend itself out of shape in order to find a way to exclude it from a category. Of course, if the items categorized as "general" are all true counterexamples to membership in other categories, then those items are valuable members of the training set. Otherwise, one should consider eliminating all items so labeled from the data used in training. Experimentation may be called for to decide what works best in practice.

9. In connection with the last consideration, there is nothing inherently wrong with some electronic communications not being assigned any category. Some communications may be too complex or too poorly written for any machine learning methods to work and will require the use of the human brain to interpret.

Automatically categorizing incoming electronic communications with respect to a categorization scheme created in accordance with these principles will impact the business in several ways. While working through the data and process gathering steps required, process improvements will be uncovered. If applied, improvements can also impact the organizational efficiency:

Proper categorization will result in shorter turn-around time in getting back to the customer, thereby increasing customer satisfaction.

Time saved by routing a communication to the correct person first may result in reduced costs.

Redundant questions will not be handled by humans since autoresponses can be sent, potentially reducing headcount.

It will be easier to see how to handle increasing web volume without adding headcount by intelligently shifting existing personnel.

By routing queries to appropriate respondents, personnel can work on more challenging questions, thereby potentially increasing employee retention.

The following tasks require dedicated time and effort, but are necessary to create an appropriate categorization scheme for an organization:
1. Mapping current workflows, business processes, and personnel skills.
2. Formalizing casual relationships between types of data and responses.
3. Quickly capturing and applying changes to business processes, workflows and personnel skills to the automated routing and response system.

However, time spent on the above tasks enables further understanding of the business processes used by the organization and if studied, can lead to further process improvements.

The overall impact is that automatically categorizing electronic communications using a categorization scheme constructed according to the present invention will take some time to set up, but will result in increased customer satisfaction due to shorter turn around times and the ability to handle more electronic communications by reallocating existing resources. However, the time needed for setup is minimized by following the methodology of the present invention because of the consideration of the many factors that bear on the problem of category scheme creation inherent in this method.

While the invention has been described in terms of its preferred embodiments, those skilled in the art will recognize that the invention can be practiced with modification within the spirit and scope of the appended claims.

What is claimed is:

1. A computer implemented method for categorizing incoming electronic communications using a supervised machine learning component, and for factoring an organization's business domain into the technology domain to enable an acceptable automated response and routing scheme, said method comprising the steps of:
   (a) analyzing the business domain;
   (b) determining an approach to machine learning using a program or an algorithm for inducing a categorizer using supervised learning, the categorizer being generated from training data comprising a set of examples of the type of electronic communications to be classified;
   (c) collecting existing data of representative examples of electronic communications and inventories of personnel skills, business processes, workflows, and business missions;
   (d) Analyzing the collected data for determining one or more attributes of said electronic communications selected from the group consisting of complexity, vagueness, and uniqueness to be expected in the type of communications to be categorized, as well as the relative numbers of electronic communications having a particular attribute of said one or more attributes, and for determining a technical structure of the communications relevant to categorization, and factoring the inventories of personnel skills, business processes, workflows, and business missions collected to determine what must be done with each electronic communication, and by whom;
   (e) defining a categorization scheme;
   (f) labeling examples of electronic communications with categories from the categorization scheme for use both as training data to be used in the supervised learning step and as test data;
   (g) converting, using a computer, the labeled examples into a form suitable for subsequent processing, both for purposes of machine learning and technical validation;
   (h) performing using said computer, machine based supervised learning technology to induce said categorizer for the categorization scheme; and
   (i) validating the categorization scheme with respect to technical performance and business requirements.

2. A method as recited in claim 1, further comprising the step of implementing the categorization scheme by putting the categorization system into production.

3. A method as recited in claim 1, further comprising the steps of:
   reviewing the categorization scheme to consider its adequacy in light of recent distribution of communications; and
   modifying the categorization scheme, as required, to accommodate new business goals, or to keep in step with changes in the supervised learning technology, wherein if it is determined to change the categorization scheme, steps (f) through (i) are repeated.

4. A method as recited in claim 1, wherein the step of analyzing the business domain further comprises steps:
   analyzing anticipated content of relevant electronic communications;
   analyzing business missions and goals;
   evaluating skills of involved personnel;
   analyzing the organization's workflow;
   analyzing use of stored responses including determining whether answers have been developed for frequently occurring questions; and
   producing business requirements for use in the validation step using insight gained by the analysis of the business domain.

5. A method as recited in claim 4, wherein the step of analyzing business missions and goals further comprises:
   reviewing a model of the business domain and determining success criteria and measurements used to determine when the business is successful;
   establishing turnaround times for the electronic communications to support mission and goals of the business; and
   determining a volume of electronic communications received daily and determining a number of received communications that must be answered to meet the goals of the business.

6. A method as recited in claim 4, wherein the step of analyzing the organization's workflow, further comprises:
   determining a workflow through the organization and routing performed on a category by category basis;
   determining if subject matter experts (SME) have been established for categories of information; and
   determining whether an automated or manual system for routing electronic communications is being used.

7. A method as recited in claims 1, wherein the step of defining a categorization scheme further comprises steps:
   combining lists of categories in the group of categories related to business mission groups, related to routing communications to specific individuals, communications for which an automated response is feasible and desirable, and those related to existing stored responses or stored templates for responses;
   determining technically feasible categorization from the assembled categorization scheme;
   correlating knowledge of the technical structure of the communications with knowledge of what kinds of features can actually be identified by the machine learning component; and eliminating or combining categories with few examples, if necessary.

8. A computer-implemented method for categorizing incoming electronic communications using a supervised machine learning component, and for factoring an organization's business domain the technology domain to enable an acceptable automated response and routing scheme, said method comprising the steps of:

selecting a machine learning component for the technology domain;

preparing a set of training data comprising representations of previously categorized electronic communications, wherein the data in an electronic communication is textual and each electronic communication has features, where a feature is related to textual data;

analyzing the organization's business domain with respect to desired routing and handling of contemplated message categories of electronic communications, the analysis resulting in identification of tasks to be performed and actions to be taken in response to a received electronic communication of a contemplated message category, the analysis also resulting in identification of features relevant to categorization of electronic communications;

determining skill levels of personnel corresponding to required tasks and actions identified in the step of analyzing the organization's business domain;

extracting, using a computer, a new representation of each electronic communication in the training set depending on a frequency of occurrence in the electronic communication of features identified as relevant to the business domain;

inducing a pattern characterization when an electronic communication belongs to a category, wherein the patterns are presented as rules or another format correspond the selected machine learning component; and developing, using said computer, an initial categorization scheme based on areas of the business domain receiving a greater quantity of electronic communications or electronic communications of a relatively higher priority.

9. A method as recited in claim 8, wherein an electronic communication comprises more than one part and each part of the electronic communication has corresponding features related to a category and categorized based on each part in the inducing step.

* * * * *